United States Patent
Ghimire et al.

(10) Patent No.: US 9,558,435 B2
(45) Date of Patent: Jan. 31, 2017

(54) COMMUNICATION APPARATUS BEING SELECTIVELY POWERED BY A MAIN POWER SUPPLY OR A BACK-UP POWER SUPPLY DEPENDING ON THE OPERATING MODE OF THE COMMUNICATION APPARATUS

(71) Applicant: BROTHER KOGYO KABUSHIKI KAISHA, Nagoya-shi, Aichi-ken (JP)

(72) Inventors: Jagatjyoti Ghimire, Nagoya (JP); Takato Mori, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 210 days.

(21) Appl. No.: 14/317,620

(22) Filed: Jun. 27, 2014

(65) Prior Publication Data

US 2015/0002876 A1    Jan. 1, 2015

(30) Foreign Application Priority Data

Jun. 28, 2013   (JP) .................... 2013-136696

(51) Int. Cl.
  *G06F 1/26*   (2006.01)
  *G06K 15/00*  (2006.01)
  *H04M 11/06*  (2006.01)

(52) U.S. Cl.
  CPC ........ *G06K 15/4055* (2013.01); *H04M 11/066* (2013.01)

(58) Field of Classification Search
  CPC ................... G06K 15/4055; H04M 11/066
  (Continued)

(56) References Cited

U.S. PATENT DOCUMENTS 5,848,281 A  12/1998 Smalley et al.
8,593,672 B2 11/2013 Aoyama et al.
(Continued)

FOREIGN PATENT DOCUMENTS

EP      1057652 A2   12/2000
JP   2001-045678 A    2/2001
(Continued)

OTHER PUBLICATIONS

US Office Action dated Nov. 30, 2015 from related U.S. Appl. No. 14/193,751.

(Continued)

*Primary Examiner* — Robert Cassity
(74) *Attorney, Agent, or Firm* — Scully, Scott, Murphy & Presser, P.C.

(57) ABSTRACT

A main power supply supplies a supply target including a network connector with power for allowing the supply target to operate. The network connector operates by using power supplied from the main power supply. A network-event detector detects an electrical change in the telephone network as a network event. A backup power supply is provided separately from the main power supply and is charged with power supplied from the main power supply during operation of the main power supply. A normal-mode setter operates by using power supplied from the backup power supply in a stopped mode, and to set an operational mode to a normal mode in response to occurrence of a voltage reduction state in a backup voltage. A forcing discharger discharges charged power of the backup power supply in response to the network-event detector detecting the network event in the stopped mode, thereby generating the voltage reduction state.

18 Claims, 5 Drawing Sheets

(58) Field of Classification Search
USPC .......................................................... 713/300
See application file for complete search history.

(56) References Cited

U.S. PATENT DOCUMENTS

| | | | |
|---|---|---|---|
| 8,718,248 B2 | 5/2014 | Baba | |
| 8,898,490 B2 | 11/2014 | Koga | |
| 2007/0070384 A1 | 3/2007 | Jeon | |
| 2007/0201049 A1* | 8/2007 | Semma | G03G 15/2039 358/1.1 |
| 2009/0195211 A1* | 8/2009 | Wang | G01R 31/3679 320/136 |
| 2011/0235083 A1 | 9/2011 | Suzuki | |
| 2012/0290853 A1* | 11/2012 | He | G06F 11/325 713/300 |
| 2013/0159736 A1* | 6/2013 | Yanagawa | G06F 1/263 713/300 |
| 2013/0283071 A1* | 10/2013 | Ushiro | G03G 15/80 713/310 |
| 2014/0164795 A1* | 6/2014 | Wright | H04L 12/10 713/300 |
| 2015/0180257 A1* | 6/2015 | Snyder | H01M 10/441 320/103 |

FOREIGN PATENT DOCUMENTS

| | | |
|---|---|---|
| JP | 2002-232590 A | 8/2002 |
| JP | 2005-057500 A | 3/2005 |
| JP | 2006-108820 A | 4/2006 |

OTHER PUBLICATIONS

U.S. Appl. No. 14/193,751, filed Feb. 28, 2014, entitled "Communication Apparatus", first named inventor: Jagatjyoti Ghimire.
Japanese Office Action dated May 10, 2016 received in related application JP 2013-039582 together with an English language translation.

* cited by examiner

COMMUNICATION APPARATUS BEING SELECTIVELY POWERED BY A MAIN POWER SUPPLY OR A BACK-UP POWER SUPPLY DEPENDING ON THE OPERATING MODE OF THE COMMUNICATION APPARATUS

CROSS REFERENCE TO RELATED APPLICATIONS

This application claims priority from Japanese Patent Application No. 2013-136696 filed Jun. 28, 2013. The entire content of the priority application is incorporated herein by reference.

TECHNICAL FIELD

The invention relates to a communication apparatus that is connectable to a telephone network.

BACKGROUND

There are communication apparatuses having functions of performing communication through a telephone network via a switch board such as a telephone function and a facsimile function (hereinafter referred to as "telephone-network communication function"). These communication apparatuses generally have a main power-supply circuit for supplying various units in the apparatus with electric power. For example, in a multifunction peripheral, when a power switch is turned on, the main power-supply circuit supplies electric power to various units in the apparatus, such as a print mechanism, a copy mechanism, a DAA (Data Access Arrangement) and a modem.

Recently, for reducing power consumption, various electrical equipment including communication apparatuses is provided with, as operational modes, a normal mode in which the main power-supply circuit can supply various units with electric power and a sleep mode in which power supply from the main power-supply circuit is stopped except that micro power is supplied to a requisite minimum circuit such as a control circuit.

SUMMARY

A demand for reducing power consumption is increasing year by year and hence further power saving is expected. As a method for further reducing power consumption than the sleep mode, it is conceivable to provide a mode of completely stopping power supply from a main power-supply circuit (hereinafter referred to as "OFF mode").

In the OFF mode, power supply to the control circuit and various communication circuits is cut off, and the operations stop completely. In the OFF mode, however, the operations of only minimum functions such as ON/OFF detection of a power switch and OFF-mode cancel condition detection are continued with a backup power supply such as a secondary battery and a supercapacitor. Hence, in the OFF mode, a power saving effect better than the sleep mode can be obtained, while maintaining minimum functions.

If a communication apparatus having a telephone-network communication function is provided with the OFF mode as an operational mode, a good power saving effect can be obtained. However, because the operations of various communication circuits such a DAA and a modem are stopped in the OFF mode, various events from the telephone network side such as call signals and polarity reversion cannot be detected. Hence, in the communication apparatus having the telephone-network communication function, it is not realistic to set the operational mode to the OFF mode in order to operate with incoming telephone calls and facsimiles that can happen any time.

In view of the foregoing, the invention provides a communication apparatus. The communication apparatus includes a network connector, a main power supply, a network-event detector, a backup power supply, a normal-mode setter, and a forcing discharger. The network connector is connectable to a telephone network to perform transmission and reception of signals through the telephone network. The main power supply is configured to supply a supply target including the network connector with power for allowing the supply target to operate. The network connector is configured to operate by using power supplied from the main power supply. The network-event detector is configured to detect an electrical change in the telephone network as a network event. The backup power supply is provided separately from the main power supply and configured to be charged with power supplied from the main power supply during operation of the main power supply, the backup power supply having a backup voltage. The normal-mode setter is configured to operate by using power supplied from the backup power supply in a state where an operational mode of the communication apparatus is set to a stopped mode, and to set the operational mode to a normal mode in response to occurrence of a voltage reduction state in the backup voltage. The stopped mode is a mode in which the main power supply stops supply of power to the network connector and supply of power to the backup power supply. The normal mode is a mode in which the main power supply supplies the supply target with power. The forcing discharger is configured to discharge charged power of the backup power supply in response to the network-event detector detecting the network event in the stopped mode, thereby generating the voltage reduction state in the backup voltage.

BRIEF DESCRIPTION OF THE DRAWINGS

Embodiments in accordance with the invention will be described in detail with reference to the following figures wherein.

DETAILED DESCRIPTION

First Embodiment

Figure 1:
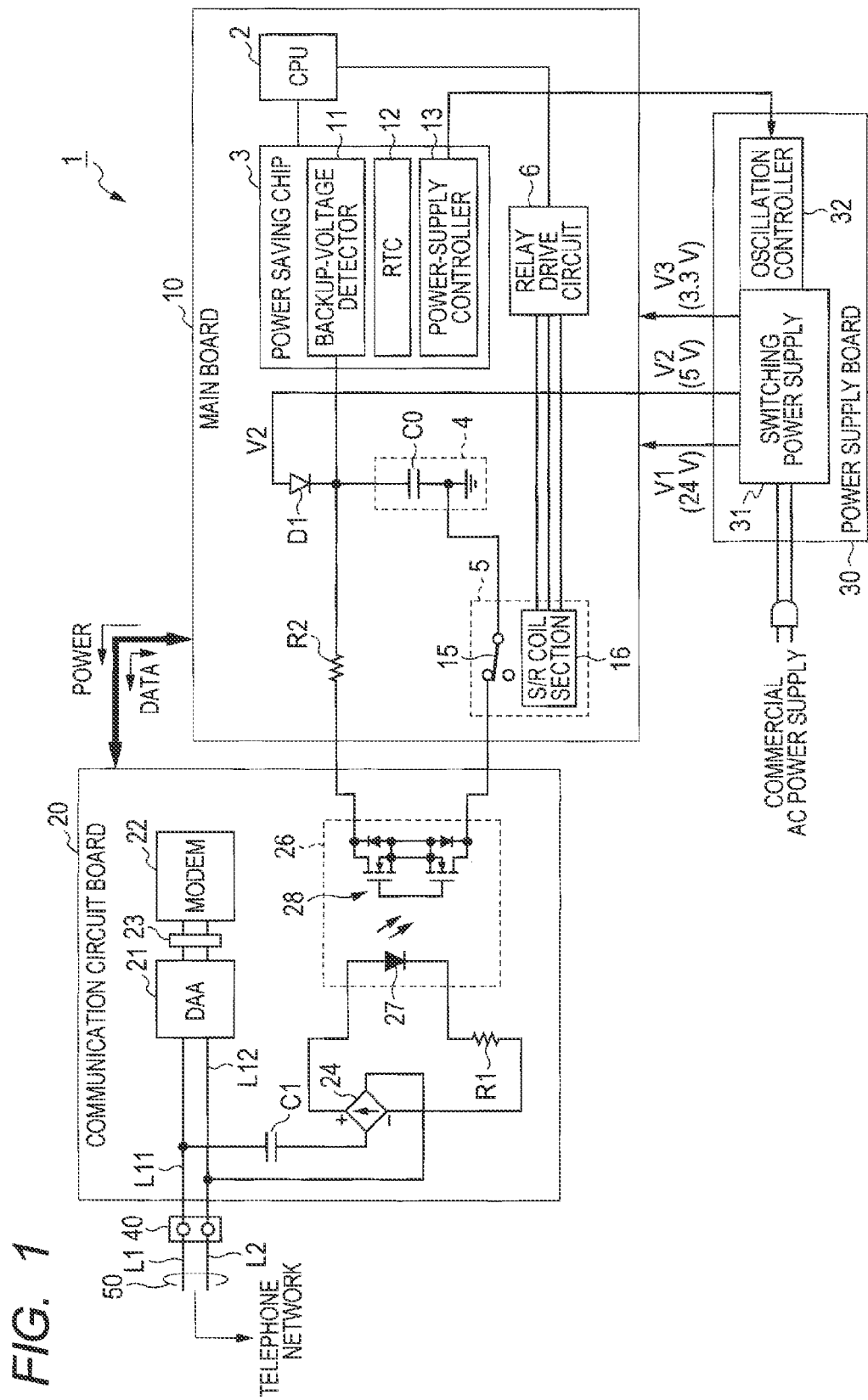
FIG. 1 is a diagram showing the overall configuration of a multifunction peripheral according to a first embodiment.

A first embodiment of the invention will be described while referring to FIGS. 1 through 3. As shown in FIG. 1, a multifunction peripheral 1 of the first embodiment has a plurality of functions such as a voice telephone call function, a facsimile communication function, a copy function, a scanner function, and so on. The multifunction peripheral 1 includes a main board 10, a communication circuit board 20, a power supply board 30, and a network connection connector (telephone-network connection connector) 40. In addition to the configuration shown in FIG. 1, the multifunction peripheral 1 includes a print mechanism that performs printing, an image reading mechanism that reads an image of an original document, and the like, which are not shown in the drawing.

The power supply board. 30 includes a switching power supply 31 and an oscillation controller 32. The switching power supply 31 generates a first DC power-supply voltage V1 of 24V, a second DC power-supply voltage V2 of 5V, and a third DC power-supply voltage V3 of 3.3V from commercial AC power inputted from the outside (for example, AC 100V power), and outputs these voltages to the main board 10 and the like. The third DC power-supply voltage V3 generated by the switching power supply 31 is supplied to the communication circuit board 20 via the main board 10. However, the third DC power-supply voltage V3 may be supplied to the communication circuit board 20 directly from the switching power supply 31.

The oscillation controller 32 oscillates or stops the switching power supply 31 based on a power-supply oscillation stop/start pulse signal inputted from the main board 10. Here, a term "oscillate" used for the switching power supply 31 means an operation of stepping down commercial AC power to each DC power-supply voltage V1, V2, and V3 and of outputting these voltages.

The oscillation controller 32 stops oscillating of the switching power supply 31 if the power-supply oscillation stop/start pulse signal is inputted from the main board 10 when the switching power supply 31 is oscillating, and starts oscillating of the switching power supply 31 if the power-supply oscillation stop/start pulse signal is inputted from the main board 10 when the switching power supply 31 is stopped.

The communication circuit board 20 includes a DAA 21, a modem 22, a transformer 23, a diode bridge 24, and a photo relay 26. The DAA 21 is connected to a public telephone network via a line cord 50. The line cord 50 is a cable for connecting the multifunction peripheral 1 to the telephone network, and includes a pair of telephone cables L1 and L2. When the line cord 50 is connected to the network connection connector 40, the pair of telephone cables L1 and L2 of the line cord 50 is connected to respective ones of a pair of network connection lines (telephone-network connection lines) L11 and L12 in the communication circuit board 20, so that a state is achieved in which the telephone network is connected to the DAA 21.

In accordance with various commands inputted from a CPU 2 in the main board 10 via the modem 22, the DAA 21 performs closing and opening of the telephone network, detection of various input signals from the telephone network (for example, call signal, dial tone, polarity reversion and so on), transmission of various output signals to the telephone network, and the like.

The DAA 21 is connected to the modem 22 via the transformer 23. The operational power of the DAA 21 is supplied from the modem 22 via the transformer 23. Also, input and output of various signals between the DAA 21 and the modem 22 are performed via the transformer 23.

The modem 22 has a basic function of modulating or demodulating of facsimile signals that are transmitted or received in facsimile communication and, in addition to that, controls the DAA 21 in accordance with commands from the CPU 2 of the main board 10, and performs output of various signals to the DAA 21 and reception of various input signals, telephone-network voltages, and so on from the DAA 21.

The diode bridge 24 rectifies electrical changes (voltage changes) of the telephone network and outputs the rectified voltage to the photo relay 26. A pair of input terminals of the diode bridge 24 is connected to the pair of network connection lines L11 and L12, respectively. One of these, that is, the network connection line L11 is connected to an input terminal of the diode bridge 24 through a capacitor C1. The capacitor C1 is provided for removing a DC component from a voltage that is inputted to the diode bridge 24 from the telephone network. A pair of output terminals of the diode bridge 24 is connected to the photo relay 26.

The photo relay 26 is a non-contact semiconductor relay which is also referred to as a photo MOS relay, and includes a light emitting diode 27 and a light receiver 28. An anode of the light emitting diode 27 is connected to a positive output terminal of the diode bridge 24. A cathode of the light emitting diode 27 is connected to a negative output terminal of the diode bridge 24 via a resistance R1.

The light receiver 28 of the photo relay 26 has a known configuration having two N-channel MOSFETs in which a gate of one MOSFET is connected to a gate of the other MOSFET and a source of the one MOSFET is connected to a source of the other MOSFET. Drains of respective MOSFETs are connected to output terminals of the photo relay 26. A light reception controller (not shown) is provided between the gate and the source of each MOSFET. When the light emitting diode 27 is not lighted, the light reception controller turns off each MOSFET. When the light emitting diode 27 is lighted, the light reception controller receives the light and turns on each MOSFET (conduction state).

The main board 10 includes the CPU 2, a power saving chip 3, a backup power supply 4, a latching relay 5, a relay drive circuit 6, and the like. The CPU 2 performs various control processes and so on for realizing various functions provided in the multifunction peripheral 1. The functions of the CPU 2 include functions of controlling and driving each section of the relay drive circuit 6, a print mechanism (not shown), an image reading mechanism (not shown).

The latching relay 5 includes a relay switch 15 and a set (S)/reset (R) coil section 16 that drives the relay switch 15. The relay switch 15 includes a common terminal and two contacts. The common terminal is connected to a reference potential (ground potential) of the backup power supply 4 (specifically, the common terminal is connected to one end of a supercapacitor C0 of the backup power supply 4 at the reference potential side). One of the two contacts is connected to one output terminal of the photo relay 26. The contact connected to the photo relay 26 will be also hereinafter referred to as "photo-relay-side contact".

The relay switch 15 of the latching relay 5 switches between the contacts each time a pulse is inputted to the S/R coil section 16. FIG. 1 shows a state in which the relay switch 15 is switched to the photo-relay-side contact so that the common terminal is electrically connected to the photo-relay-side contact. This state is referred to as "set state" in the present embodiment. Conversely, a state in which the relay switch 15 is switched to the other contact (different from the photo-relay-side contact) is referred 10 as "reset state".

The latching relay 5 is a relay that requires energization (pulse input) to the S/R coil section 16 only at the time of switching of the relay switch 15 and that does not require constant energization for keeping a state after switching. That is, each time a pulse is inputted to the S/R coil section 16, the set/reset state of the relay switch 15 is switched.

The CPU 2 outputs a set command to the relay drive circuit 6 for making the latching relay 5 in a set state. In the present embodiment, the set command is a voltage signal of L (Low) level (for example, 0V). The CPU 2 outputs a reset command to the relay drive circuit 6 for making the latching relay 5 in a reset state. In the present embodiment, the reset command is a voltage signal of H (High) level (for example, 5V).

The relay drive circuit 6 outputs a pulse for switching the latching relay 5, based on a command from the CPU 2. Specifically, if the set command (L level signal) is inputted from the CPU 2, the relay drive circuit 6 outputs a setting pulse (set pulse) to the S/R coil section 16 of the latching relay 5 so as to set the latching relay 5 to the set state. If the reset command (H level signal) is inputted from the CPU 2, the relay drive circuit 6 outputs a resetting pulse (reset pulse) to the S/R coil section 16 of the latching relay 5 so as to set the latching relay 5 to the reset state.

The power saving chip 3 is an IC (semiconductor integrated circuit) including a backup-voltage detector 11, a RTC (real time clock) 12, and a power-supply controller 13. The power saving chip 3 operates by using the second DC power-supply voltage V2 supplied from the switching power supply 31 via a diode D1 or power supplied from the backup power supply 4. That is, even when the second DC power-supply voltage V2 is not supplied, the power saving chip 3 can operate as long as a backup voltage higher than or equal to a requisite minimum voltage (for example, 1.5V) is supplied from the backup power supply 4.

The backup-voltage detector 11 detects a voltage of the backup power supply 4 (backup voltage), that is, a charging voltage of the supercapacitor C0 and determines whether the backup voltage is lower than or equal to a preset voltage threshold. In the present embodiment, as described below, the supercapacitor C0 is charged by the second DC power-supply voltage V2 (5V) from the switching power supply 31. In the present embodiment, the voltage threshold is set to 1.5 V, for example. Hence, the backup-voltage detector 11 of the present embodiment determines whether the backup voltage is lower than or equal to 1.5 V.

The RTC 12 keeps and outputs the current time. As described below, the power-supply controller 13 outputs the power-supply oscillation stop/start pulse signal to the oscillation controller 32 of the power supply hoard 30, based on a command from the CPU 2 or on a command generated in the power saving chip 3.

The multifunction peripheral 1 has a power switch (not shown) that is operated by a user for turning on and off operations of the multifunction peripheral 1. A signal indicative of an operation state of the power switch (power switch signal) is also inputted to the power saving chip 3.

Here, the operational mode of the multifunction peripheral 1 will be described. The multifunction peripheral 1 of the present embodiment has the normal mode and the OFF mode as the operational modes.

The normal mode is an operational mode in which the switching power supply 31 supplies each section in the multifunction peripheral 1 with respective DC power-supply voltages V1, V2, and V3, so that each section in the multifunction peripheral 1 becomes operable. In the normal mode, the CPU 2 in the main board 10 operates so as to be able to perform various functions of the multifunction peripheral 1. In the communication circuit board 20, each circuit such as the DAA 21, the modem 22, and so on become operable, so that communications such as voice telephone call, facsimile communication, and so on through the telephone network can be performed. In the normal mode, the power saving chip 3 operates by using the second DC power-supply voltage V2 supplied from the switching power supply 31 via the diode D1.

On the other hand, the OFF mode is an operational mode that is set at a standby time in which the multifunction peripheral 1 is not used for a certain period, that is set when the user presses the power switch in the normal mode, or the like. And, the OFF mode is an operational mode in which oscillation of the switching power supply 31 is stopped so that supplying of each of the DC power-supply voltages V1, V2, and V3 is stopped. Because oscillation of the switching power supply 31 completely stops, standby power in the OFF mode is almost zero. Because the OFF mode is provided, the multifunction peripheral 1 of the present embodiment can achieve high level power saving.

In the normal mode, the CPU 2 constantly determines whether an OFF-mode switch condition for switching the operational mode to the OFF mode is satisfied. In the present embodiment, the OFF-mode switch condition includes, for example, that the multifunction peripheral 1 is not used for a certain period, that the power switch is pressed, and the like. The CPU 2 acquires, from the power saving chip 3, various pieces of information such as time information from the RTC 12, operation information of the power switch, and so on, in order to determine whether the OFF-mode switch condition is satisfied. If the OFF-mode switch condition is satisfied, the CPU 2 controls the power-supply controller 13 to output the power-supply oscillation stop/start pulse signal. When the power-supply controller 13 outputs the power-supply oscillation stop/start pulse signal in the normal mode, the oscillation controller 32 in the power supply board 30 controls the switching power supply 31 to stop oscillation. With this operation, the operational mode is switched from the normal mode to the OFF mode.

In the OFF mode, because oscillation of the switching power supply 31 is stopped, most circuits in the multifunction peripheral 1 such as the CPU 2, the DAA 21, and the modem 22 stop due to lack of power supply. Hence, power consumption can be further reduced, compared with the conventional sleep mode.

However, some functions need to be maintained even in the OFF mode (hereinafter referred to as "minimum basic functions"). Examples of the minimum basic functions are the RTC 12, detection of an operation of the power switch, a return-condition detecting function of detecting a return condition for cancelling the OFF mode and returning to the normal mode, the power-supply controller 13 that outputs the power-supply oscillation stop/start pulse signal for oscillating the switching power supply 31 at the time of cancelling the OFF mode, and the like. That is, even in the OFF mode, operations of each section in the power saving chip 3 need to be maintained at least.

Thus, in the present embodiment, the backup power supply 4 is provided for maintaining these minimum basic functions even in the OFF mode. Various specific configurations of the backup power supply 4 can be conceived. In the present embodiment, the supercapacitor C0 is used as the backup power supply 4.

In the normal mode, the supercapacitor C0 is supplied with the second DC power-supply voltage V2 of 5V from the switching power supply 31, and thus charged to a particular voltage (5V in the present embodiment). In the OFF mode, charging power of the supercapacitor C0 is supplied to the power saving chip 3 as backup power. This backup power enables the power saving chip 3 to operate, thereby maintaining the minimum basic functions even in the OFF mode.

In the present embodiment, the return condition for returning the operational mode from the OFF mode to the normal mode includes that the power switch is pressed, that charging voltage of the supercapacitor C0 (backup voltage) becomes lower than or equal to a voltage threshold, that the OFF mode continues for a certain period, that an open-close cover (not shown) of the multifunction peripheral 1 is operated to open or close, and so on.

Specifically, if the power switch is pressed in the OFF mode, the operation information is inputted to the power saving chip 3. This causes the power-supply controller 13 to output the power-supply oscillation stop/start pulse signal to the oscillation controller 32, so that the operational mode is returned to the normal mode. Also, if the OFF mode continues for a certain period, the operational mode is temporarily returned to the normal mode to perform a particular process such as a cleaning process of the print mechanism, for example. If the operational mode is returned to the normal mode after the OFF mode continues for a certain period, the CPU 2 performs a particular necessary process and subsequently switches the operational mode to the OFF mode.

In the OFF mode, charging power of the supercapacitor C0 is consumed in the power saving chip 3 for maintaining the minimum basic functions. Thus, in the OFF mode, the backup voltage of the supercapacitor C0 gradually decreases from a prescribed charging voltage (5V).

Hence, if the charging voltage of the supercapacitor C0 becomes lower than or equal to the voltage threshold (1.5V in the present embodiment) in the OFF mode, the power saving chip 3 temporarily returns the operational mode to the normal mode so that oscillation of the switching power supply 31 is restarted for charging the supercapacitor C0. The backup-voltage detector 11 monitors the charging voltage of the supercapacitor C0 and, if the charging voltage becomes lower than or equal to the voltage threshold, causes the power-supply controller 13 to output the power-supply oscillation stop/start pulse signal, so that the operational mode is returned from the OFF mode to the normal mode. Cancellation of the OFF mode in this case is cancellation for replenishing charging power of the supercapacitor C0. Hence, although the OFF mode is cancelled temporarily, once the supercapacitor C0 is charged to a voltage (5V, for example) that is sufficiently higher than the voltage threshold, the CPU 2 again switches the operational mode to the OFF mode.

A specific value of the voltage threshold can be set appropriately. For example, the voltage threshold may be set to a voltage that is higher, by a particular value, than a minimum requisite voltage for maintaining (performing) the minimum basic functions in the power saving chip 3. That is, the voltage threshold may be set to such a value that, even if the backup voltage further decreases from when the backup voltage becomes lower than or equal to the voltage threshold until when the operational mode is returned to the normal mode and charging of the supercapacitor C0 is started, a voltage value for continuing the operations of the power saving chip 3 can be maintained. For example, the particular value is an amount of voltage that drops from when the power-supply controller 13 outputs the power-supply oscillation stop/start pulse signal to the oscillation controller 32 until when the switching power supply 31 starts oscillating to charge the supercapacitor C0.

In the multifunction peripheral 1 having the OFF mode as an operational mode in the present embodiment, when the operational mode becomes the OFF mode, power supply from the switching power supply 31 to the communication circuit board 20 is cut off. Hence, in the OFF mode, the DAA 21 cannot detect a network event (telephone-network event) even when an electrical change (network event) occurs in the telephone network originating from control operations and so on of the telephone network side via a switch board, such as polarity reversion of the telephone network, an input of a call signal, or the like.

Thus, the multifunction peripheral 1 of the present embodiment has a mechanism for detecting occurrence of a network event even in the OFF mode and for returning the operational mode to the normal mode. This mechanism will be described in detail.

The communication circuit board 20 includes the diode bridge 24 and the photo relay 26. Hence, if a network event occurs in the OFF mode, the diode bridge 24 outputs an electric current to the light emitting diode 27 of the photo relay 26, which causes the light emitting diode 27 to emit light. When light of the light emitting diode 27 is received by the light receiver 28, the light receiver 28 turns on. More specifically, two MOSFETs provided in the light receiver 28 turn on, and the output terminals of the photo relay 26 are electrically connected within the photo relay 26.

On the other hand, a discharging path for discharging charging power of the supercapacitor C0 is provided with the supercapacitor C0 of the main board 10. Specifically, the discharging path is a path leading from one end of the supercapacitor C0 (the high potential side) to the other end of the supercapacitor C0 (the reference potential side) through an electric-current regulating resistance R2, the light receiver 28 of the photo relay 26, and the latching relay 5.

As described earlier, in the OFF mode, the latching relay 5 is set to the set state (the state shown in FIG. 1). Hence, when the photo relay 26 turns on due to occurrence of a network event, a closed circuit of low impedance is formed between both terminals of the supercapacitor C0. That is, the above-mentioned discharging path is electrically connected in its entirety. Hence, charging power of the supercapacitor C0 is discharged through the discharging path of low impedance. That is, the multifunction peripheral 1 is so configured that, when a network event occurs in the OFF mode, charging power of the supercapacitor C0 is discharged forcibly.

As the charging power of the supercapacitor C0 is discharged, the charging voltage (backup voltage) gradually decreases. And, when the backup voltage becomes lower than or equal to a voltage threshold, the backup-voltage detector 11 in the power saving chip 3 detects that the backup voltage is lower than or equal to the voltage threshold, and the power-supply controller 13 outputs a power-supply oscillation stop/start pulse signal. Thus, the switching power supply 31 oscillates and the operational mode returns to the normal mode.

Once the operational mode returns to the normal mode, power is supplied to the communication circuit hoard 20 from the power supply board 30, and hence the modem 22 and the DAA 21 become an operable state. Thus, the DAA 21 and the modem 22 can perform various processes corresponding to network events that occur.

The light receiver 28 constituting the photo relay 26 includes MOSFETs. The ON resistance of the MOSFETs is lower than the ON resistance of a light receiver of a photo coupler, for example. Also, the MOSFETs have a high ability of allowing electric currents to flow (an ability of driving electric currents), and is capable of allowing an electric current of approximately 2 A (amperes) to flow, for example. Thus, when the photo relay 26 is tuned on, the supercapacitor C0 can be discharged to a voltage lower than or equal to the voltage threshold in a short time.

A call signal is one of examples of network events in the telephone network. For example, the call signal is a signal in which changes of ON periods (occurrence of AC signal of a particular frequency) for one second and OFF periods (no voltage change) for two seconds are repeated continuously.

When the call signal of the network event occurs in the OFF mode, the multifunction peripheral 1 of the present embodiment is capable of returning to the normal mode before the ON period of one second ends. Specifically, rated specifications of each element in the discharging path, such as a resistance value of the electric-current regulating resistance R2, are set such that the backup voltage becomes lower than or equal to 1.5V within one second after a start of discharge.

The discharging period required for discharging a certain amount of charged electric charge from the supercapacitor C0 depends on the resistance value of the electric-current regulating resistance R2. As the resistance value is smaller, the discharging period is shorter. Hence, by adjusting the resistance value of the electric-current regulating resistance R2, the discharging period of the supercapacitor C0 (in other words, a slope at which the backup voltage decreases) can be adjusted. A discharging period T (a period required to discharge from V0 to V1) of the supercapacitor C0 can be represented by the following equation (1), where V0 is an initial voltage before discharge of the supercapacitor C0, V1 is a voltage after discharge, C is a capacitance of the supercapacitor C0, and R is a resistance value of the electric-current regulating resistance R2.

$$T=-C \cdot R \cdot \log(V1/V0) \quad (1)$$

For example, assume that the voltage before discharge of the supercapacitor C0 is 5V, the ON resistance of the photo relay 26 is 0.05Ω, the capacitance of the supercapacitor C0 is 0.224 F, and that the supercapacitor C0 is discharged until the voltage becomes 1.5V. At this time, for example, if the electric-current regulating resistance R2 is 0Ω, the discharging period T required for discharging to 1.5V is approximately 0.01 second based on calculations using the above equation (1). That is, if the electric-current regulating resistance R2 is not used, discharge can be done in a very short time of approximately 0.01 second. In this case, however, a large electric current flows through the discharging path, which may adversely affect the light receiver 28 of the photo relay 26, the relay switch 15 of the latching relay 5, and so on.

Hence, in the present embodiment, by providing the electric-current regulating resistance R2 of a particular resistance value, it is possible to discharge to a voltage lower than or equal to 1.5V within one second from a start of discharge, while avoiding that an electric current value during discharge becomes excessively large. For example, if the resistance value of the electric-current regulating resistance R2 is 3.5Ω, the discharging period T is approximately 0.9 second based on calculations using the above equation (1). That is, even when the electric-current regulating resistance R2 of 3.5Ω is used, the supercapacitor C0 can be discharged to a voltage lower than or equal to 1.5V within a one-second ON period of a call signal, so that the operational mode returns to the normal mode.

Note that the electric-current regulating resistance R2 having a smaller resistance value may be used, so that the operational mode can be returned from the OFF mode to the normal mode when polarity reversion occurs. Further, when the line cord 50 is connected to the multifunction peripheral 1 in a state where the line cord 50 is not connected to the multifunction peripheral 1 and where the operational mode is the OFF mode, the light emitting diode 27 emits light due to a potential difference between the pair of telephone cables L1 and L2 at the time of connection of the line cord 50. This light emission time is considerably short. However, the resistance value of the electric-current regulating: resistance R2 may be set such that the voltage of the supercapacitor C0 can be quickly discharged to a voltage lower than or equal to 1.5V even in this short time.

Adjustments of the discharging period may be performed also by changing other elements than the resistance value of the electric-current regulating resistance R2. Specifically, the entire discharging path may be designed such that the supercapacitor C0 can be discharged to a voltage lower than or equal to 1.5V within a desired time, by performing adjustments including other characteristics such as the ON resistance of the light receiver 28 of the photo relay 26 and the capacitance of the supercapacitor C0.

The functions of the latching relay 5 (an example of a breaker) provided in the discharging path will be described in greater detail. The latching relay 5 is set to the reset state in the normal mode so as to open (cut off) the discharging path. However, it is not always necessary to set the latching relay 5 to the reset state in the normal mode. That is, it is not always necessary to provide the latching relay 5 in the discharging path. Note that a multifunction peripheral 80 in a third embodiment (see FIG. 5) described later does not have the latching relay 5.

In a case where the latching relay 5 is not provided, each time a network event occurs in the normal mode, the photo relay 26 turns on and an electric current flows from the supercapacitor C0 (or the switching power supply 31) through the discharging path including the photo relay 26. This electric current in the normal mode does not have any functional meaning, and thus is useless electric current. Hence, in the present embodiment, the latching relay 5 is provided on the discharging path. And, opening the discharging path in the normal mode suppresses a situation in which a useless electric current flows through the discharging path including the photo relay 26 each time a network event occurs.

A main process executed by the CPU 2 will be described while referring to FIG. 2. Upon starting up with power supply from the switching power supply 31, the CPU 2 reads out a program of the main process shown in FIG. 2 from a memory (not shown) and executes the program. Note that, although the CPU 2 switches the operational mode from the normal mode to the OFF mode by executing the main process in FIG. 2, the CPU 2 does not actively perform switching from the OFF mode to the normal mode. In the OFF mode, the CPU 2 is not supplied with power and is in a stopped state. As described earlier, the power saving chip 3 performs switching from the OFF mode to the normal mode if the return condition is satisfied. Thus, at the time when the CPU 2 has started operations and has started the main process in FIG. 2, the operational mode is already in the normal mode (see the uppermost box in the dashed lines in FIG. 2).

Figure 2:
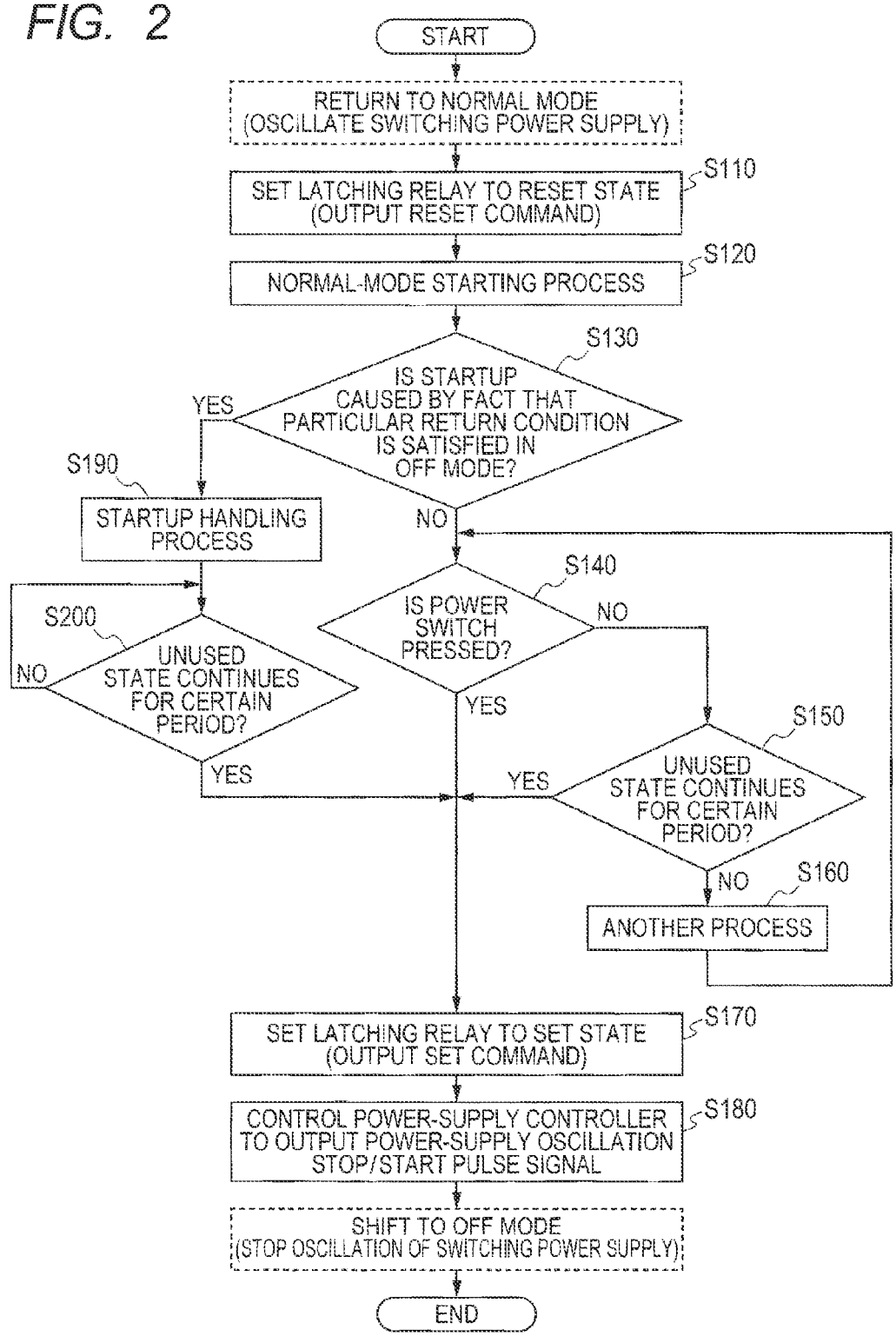
FIG. 2 is a flowchart showing a main process executed by a CPU.
Figure 3:
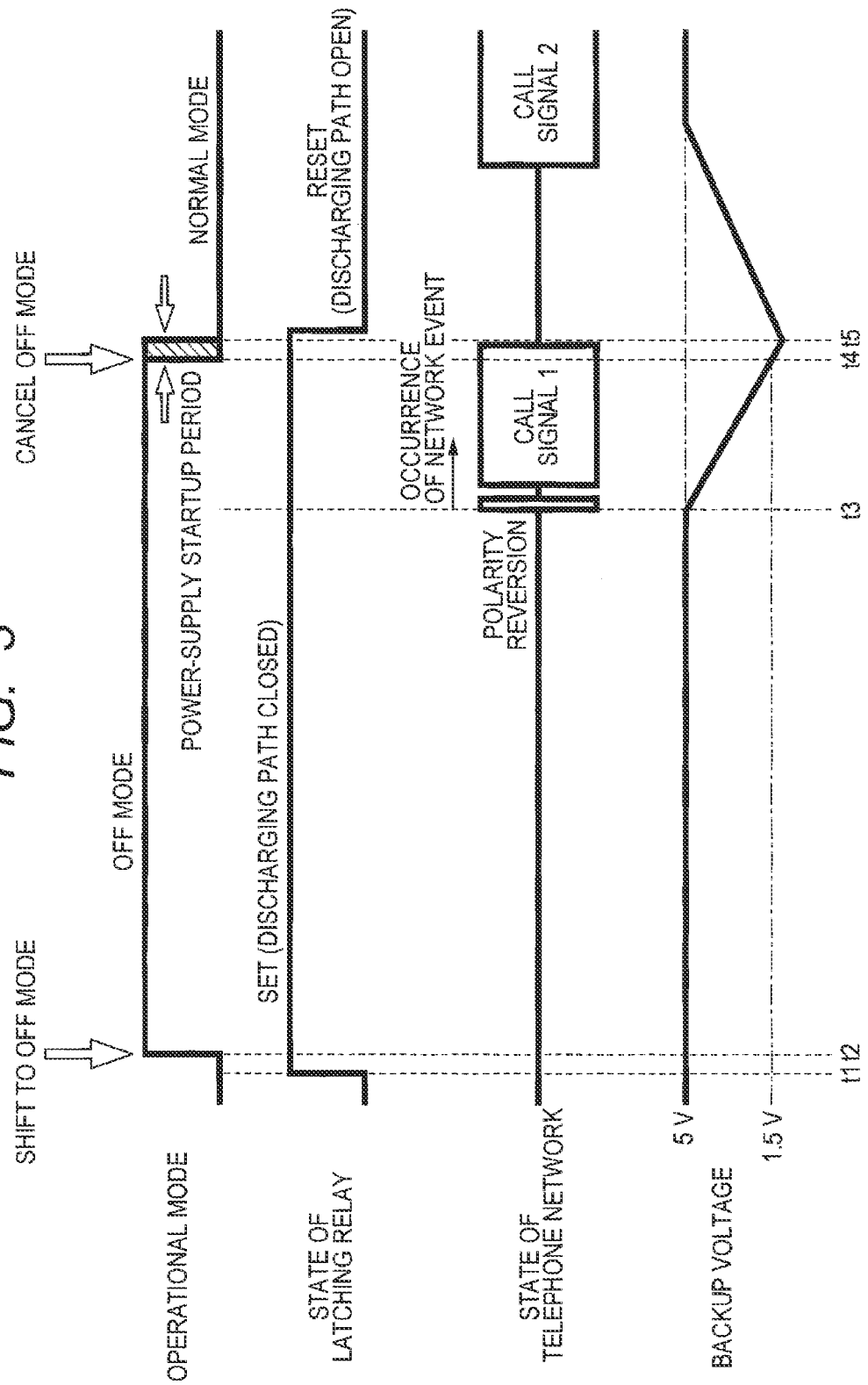
FIG. 3 is a timing chart showing an operational example at the time when a network event (telephone-network event) occurs in the multifunction peripheral according to the first embodiment.

Upon starting the main process in FIG. 2, in S110 the CPU 2 outputs a reset command to the relay drive circuit 6 so that the latching relay 5 becomes the reset state. In S120, the CPU 2 executes a normal-mode starting process. In S130, the CPU 2 determines whether the startup of the CPU 2 is caused by a fact that a particular return condition is satisfied in the OFF mode. The particular return condition is one of facts that the OFF mode continues for a certain period (a detection result by the RTC 12) and that the backup voltage becomes lower than or equal to the voltage threshold (a detection result by the backup-voltage detector 11). Here, the situation in which the backup voltage becomes lower than or equal to the voltage threshold includes both of a case that the supercapacitor C0 is discharged naturally and a case that the supercapacitor C0 is discharged forcibly due to occurrence of a network event.

If the startup of the CPU 2 is not caused by a fact that the particular return condition is satisfied in the OFF mode (for example, the startup of the CPU 2 is caused by a user's operation on the power switch for turning on the multifunction peripheral 1) (S130: No), in S140 the CPU 2 determines whether the power switch is pressed for turning off the multifunction peripheral 1. If the power switch is not pressed (S140: No), in S150 the CPU 2 determines whether an unused state continues for a certain period in which the multifunction peripheral 1 is not used. If the unused state does not continue for a certain period (S150: No), in S160 the CPU 2 performs another process (a printing process, a facsimile transmission process, and so on) and returns to S140.

If it is determined that the power switch is pressed in S140 (S140: Yes) or if it is determined that the unused state continues for a certain period in S150 (S150: Yes), the OFF-mode switch condition is satisfied and thus the CPU 2 performs processes for switching to the OFF mode in S170 and S180.

In S170, the CPU 2 outputs a set command to the relay drive circuit 6 so that the latching relay 5 becomes the set state. In S180, the CPU 2 controls the power-supply controller 13 to output the power-supply oscillation stop/start pulse signal. With this operation, the power-supply oscillation stop/start pulse signal is outputted from the power-supply controller 13 to the oscillation controller 32, so that the switching power supply 31 stops oscillation and the operational mode shifts to the OFF mode.

In S130, if the startup of the CPU 2 is caused by a fact that the particular return condition is satisfied in the OFF mode (S130: Yes), the CPU 2 proceeds to S190 and executes a startup handling process. The startup handling process is preliminarily determined, depending on which particular return condition has caused the operational mode to switch from the OFF mode to the normal mode. For example, if the operational mode switches to the normal mode because the backup voltage of the supercapacitor C0 is lower than or equal to the voltage threshold, the startup handling process is charging the supercapacitor C0 to a certain level (charging to 5V in the present embodiment). Upon finishing the startup handling process in S190, the CPU 2 proceeds to S200.

In S200 the CPU 2 determines whether an unused state continues for a certain period in which the multifunction peripheral 1 is not used. If the unused state does not continue for a certain period (S200: No), the CPU 2 repeats S200. If the unused state continues for a certain period (S200: Yes), the CPU 2 proceeds to S170. More specifically, if the supercapacitor C0 is discharged naturally and it is determined in S130 that the backup voltage becomes lower than or equal to the voltage threshold, after performing the startup handling process in S190, the multifunction peripheral 1 is not used. Thus, the CPU 2 proceeds to S170 shortly. On the other hand, if the supercapacitor C0 is discharged forcibly due to a network event and it is determined in S130 that the backup voltage becomes lower than or equal to the voltage threshold, the startup handling process is performed in S190 and also a process for handling the network event (such as handling an incoming telephone call or facsimile) is performed. If the unused state continues for a certain period (S200: Yes) after the process for handling the network event is finished, the CPU 2 proceeds to S170.

Next, out of operations of the multifunction peripheral 1 in the present embodiment, an operational example will be described while referring to FIG. 3 in which the operational mode switches to the normal mode due to occurrence of a network event in the OFF mode. If the OFF-mode switch condition is satisfied in the normal mode, the CPU 2 performs a process needed prior to switching to the OFF mode and sets the latching relay 5 (t1). With this operation, the operational mode shifts to the OFF mode (t2). Here, a period between t1 and t2 is a period for stopping oscillation of the switching power supply 31.

After shifting to the OFF mode, if a network event such as polarity reversion occurs (t3), the photo relay 26 turns on and the charged electric charge of the supercapacitor C0 is discharged. A call signal (ON for one second) is inputted after polarity reversion. Hence, the voltage of the supercapacitor C0 decreases due to discharge, and reaches to 1.5V (t4).

Thus, the power-supply controller 13 of the power saving chip 3 outputs the power-supply oscillation stop/start pulse signal to the power supply board 30 so as to oscillate the switching power supply 31, so that the operational mode returns to the normal mode (t5). Upon returning to the normal mode, the supercapacitor C0 is charged by the second DC power-supply voltage V2 from the switching power supply 31, and thus the backup voltage again increases to 5V. In addition, the latching relay 5 becomes the reset state.

As described above, in the multifunction peripheral 1 of the present embodiment, in the OFF mode, network events can be detected by a network-event detecting circuit that includes the diode bridge 24, the photo relay 26, and so on. Further, the multifunction peripheral 1 of the present embodiment is configured to return to the normal mode when the backup voltage becomes lower than or equal to the voltage threshold (1.5V) in the OFF mode.

More specifically, when a network event is detected and the photo relay 26 turns on in the OFF mode, the supercapacitor C0 is forcibly discharged and the backup voltage decreases to a voltage lower than or equal to 1.5V, which causes the operational mode to return to the normal mode.

This achieves the OFF mode in which the operation of the switching power supply 31 is completely stopped to make power consumption approximately zero and it is very effective in terms of power saving, while maintaining a state in which a network event can be detected even in the OFF mode. In addition, a configuration for forcibly discharging the supercapacitor C0 is realized by a simple discharging path including the photo relay 26 and the latching relay 5. Thus, it is possible to simplify the overall configuration of the multifunction peripheral 1 and to reduce the cost of the multifunction peripheral 1.

According to the multifunction peripheral 1 of the present embodiment, conduction or shutoff of the discharging path based on occurrence of a network event is realized by using the photo relay 26. Hence, when a network event occurs in the OFF mode, the charged electric charge of the supercapacitor C0 can be discharged quickly via the MOSFETs in the photo relay 26, so that the backup voltage quickly decreases to a voltage lower than or equal to the voltage threshold. Thus, switching from the OFF mode to the normal mode can be performed quickly.

Various conditions can be conceived as the return condition from the OFF mode to the normal mode based on the backup voltage of the supercapacitor C0. In the present embodiment, the return condition is a simple condition that the backup voltage becomes lower than or equal to the voltage threshold. Hence, it is possible to reduce a processing load in the power saving chip 3 for determining whether the return condition is satisfied based on the backup voltage, and to simplify a specific configuration for making that determination (the configuration of the backup-voltage detector 11).

The multifunction peripheral 1 of the present embodiment includes the latching relay 5. Thus, even if a network event occurs and the photo relay 26 turns on in the normal mode, no electric current flows from the supercapacitor C0 or the switching power supply 31 through the discharging path including the photo relay 26. This suppresses useless electric current in the normal mode and further increases a power saving effect. In addition, since the latching relay 5 is used, energization (pulse) is necessary only at the time of switching of set and reset, and energization is not necessary at other times. Thus, a high power saving effect can be obtained, compared with a case of using a normal relay that needs to be constantly energized in the normal mode, for example.

According to the multifunction peripheral 1 of the present embodiment, an electrical change of the telephone network is rectified by the diode bridge 24 and is inputted to the light emitting diode 27 which is the primary side of the photo relay 26. With this configuration, the light emitting diode 27 can be lighted in response to an electrical change, regardless of the polarity of the telephone network. This increases a time during which the light emitting diode 27 emits light, and hence increases a discharging period during which an electric charge is discharged from the supercapacitor C0.

Second Embodiment

Figure 4:
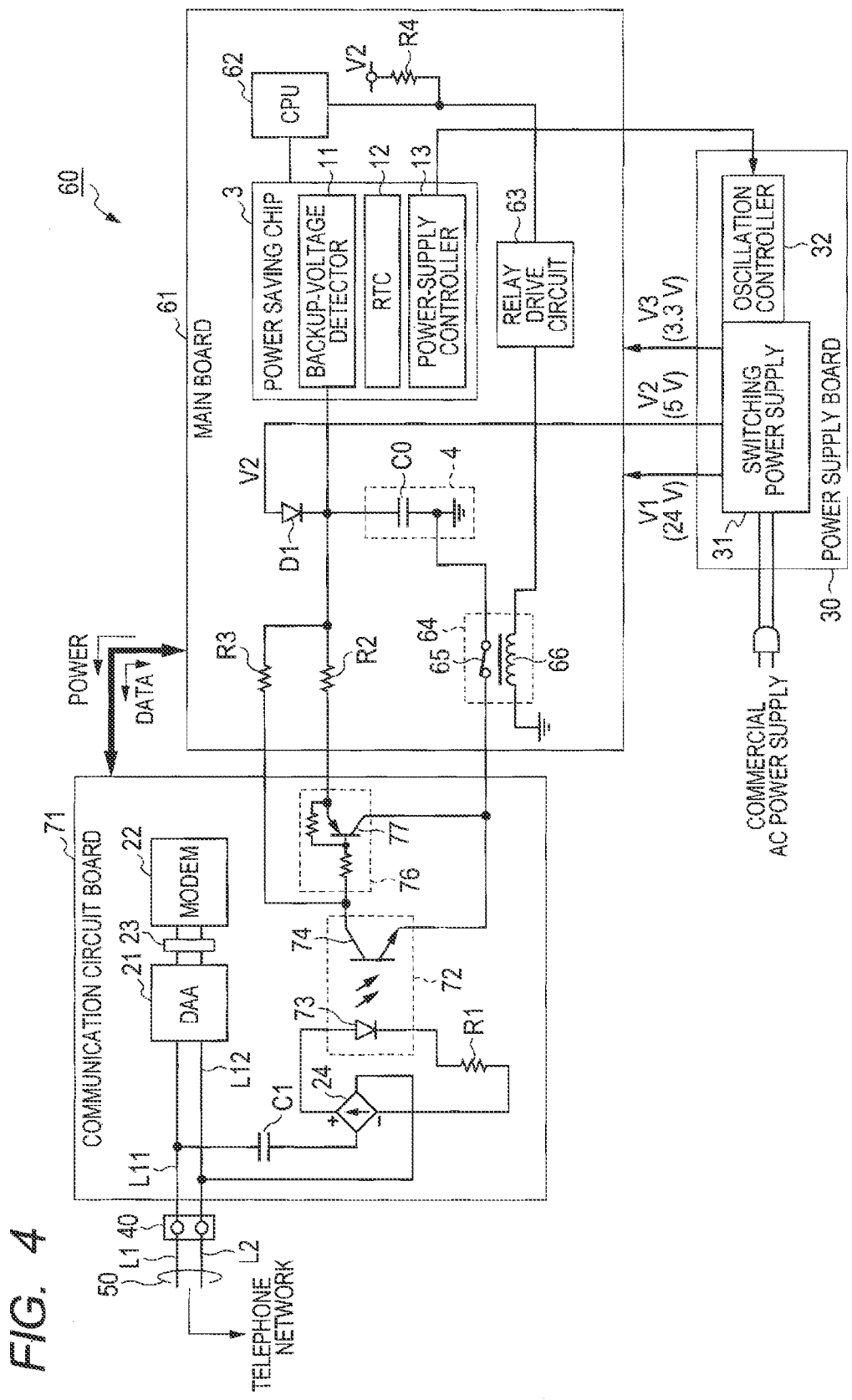
FIG. 4 is a diagram showing the overall configuration of multifunction peripheral according to a second embodiment.

A multifunction peripheral 60 according to a second embodiment will be described while referring to FIG. 4. The multifunction peripheral 60 of the present embodiment shown in FIG. 4 has a different configuration from that of the multifunction peripheral 1 shown in FIG. 1 mainly in the following four features (a) to (d).
(a) A photo coupler 72 is used instead of the photo relay 26.
(b) In the discharging path, a transistor 76 for forming a discharging path is connected in parallel with the photo coupler 72.
(c) A normal relay (monostable relay) 64 is used instead of the latching relay 5. The monostable relay 64 has a normally-closed contact and is configured to hold an OFF (open) state when the coil is energized.
(d) The second DC power-supply voltage V2 is applied, via a pull-up resistor R4, to an output line of the set and reset commands, the output line leading from a CPU 62 to a relay drive circuit 63.

The photo coupler 72 includes a light emitting diode 73 and a phototransistor 74. An anode of the light emitting diode 73 is connected to a positive output terminal of the diode bridge 24, and a cathode of the light emitting diode 73 is connected to a negative output terminal of the diode bridge 24 via a resistance R1. Hence, when a network event occurs and an electrical change is generated in the telephone network, the light emitting diode 73 emits light and the phototransistor 74 turns on during that light emission period.

An emitter of the phototransistor 74 is connected to reference potential side of the supercapacitor C0 via the relay 64 in the main board 61. A collector of the phototransistor 74 is connected to the positive side of the supercapacitor C0 via an electric-current regulating resistance R3, and is also connected to the transistor 76.

The transistor 76 is specifically a transistor of a bias resister built-in type, and includes a PNP-type bipolar transistor 77 and two bias resisters. An emitter of the transistor 76 is connected to the positive side of the supercapacitor C0 via an electric-current regulating resistance R2. A collector of the transistor 76 is connected to the emitter of the phototransistor 74 in the photo coupler 72. A base of the transistor 76 is connected to the collector of the phototransistor 74.

The relay 64 includes a normally-closed contact 65 and a relay coil 66. One end of the contact 65 is connected to the collector of the transistor 76, and is also connected to the emitter of the phototransistor 74 in the photo coupler 72. The other end of the contact 65 is connected to the reference potential side of the supercapacitor C0. One end of the relay coil 66 is connected to the relay drive circuit 63, and the other end of the relay coil 66 is connected to ground.

An ON or OFF state of the transistor 76 depends on an ON or OFF state of the phototransistor 74 in the photo coupler 72. That is, when the phototransistor 74 is OFF, the base and the emitter of the transistor 77 become equipotential, and thus the transistor 76 is also OFF. On the other hand, when the phototransistor 74 is ON, the base of the transistor 76 become a low potential close to a ground potential, which causes the transistor 76 to turn on. This is a state in which a discharging path through the phototransistor 74 and a discharging path through the transistor 76 are connected in parallel with the both ends of the supercapacitor C0. Hence, the electric charge of the supercapacitor C0 is discharged through both of the phototransistor 74 and the transistor 76.

Here, it is possible to discharge the supercapacitor C0 through the photo coupler 72, without providing the transistor 76. However, because the photo coupler 72 has a lower electric-current driving capacity than the photo relay, it takes a longer discharging period than the photo relay. Hence, there is a possibility that, without the transistor 76, the photo coupler 72 cannot discharge the supercapacitor C0 to a voltage lower than or equal to the voltage threshold, when a network event occurs.

Thus, in the present embodiment, in addition to the photo coupler 72, the transistor 76 is provided in parallel with the photo coupler 72. Because the transistor 76 has a higher electric-current driving capacity, the transistor 76 allows a larger electric current than the photo coupler 72 to flow therethrough. Hence, in a similar manner to the first embodiment, the entire circuit (including the photo coupler 72 and the transistor 76) is capable of discharging the supercapacitor C0 in a short time.

While a reset command (H level signal) is inputted from the CPU 62, the relay drive circuit 63 causes an electric current to flow through the relay coil 66 so as to turn off the contact 65 (open state). While a set command (L level signal) is inputted from the CPU 62, the relay drive circuit 63 stops energization to the relay coil 66 so as to turn on the contact 65 (closed state).

Upon starting up, the CPU 62 performs a particular initial process and so on, and outputs a reset command to the relay drive circuit 63. Hence, there is a time difference from when the switching power supply 31 starts supplying of power to the main board 61 until when the reset command is inputted to the relay drive circuit 63 from the CPU 62. Thus, even if the operational mode returns to the normal mode, the relay 64 does not turn off immediately and keeps on for a certain time (the above-mentioned time difference) from the start of power supply. Thus, during a certain time after the operational mode returns to the normal mode and until the CPU 62 outputs the reset command, although it is a considerably short time, useless discharge occurs through the photo coupler 72 and the transistor 76 each time a network event occurs.

Thus, in the present embodiment, the second DC power-supply voltage V2 is applied to a command output line between the CPU 62 and the relay drive circuit 63, via the pull-up resistor R4. With this configuration, when the operational mode returns from the OFF mode to the normal mode and the switching power supply 31 outputs the second DC power-supply voltage V2, the second DC power-supply voltage V2 is inputted to the relay drive circuit 63 via the pull-up resistor R4. This is equivalent to a state in which a reset command is inputted to the relay drive circuit 63 from the CPU 62. Hence, the relay 64 turns off almost at the same time as start of supplying of the second DC power-supply voltage V2. That is, without waiting for a reset command from the CPU 62, the relay 64 can be turned off almost at the same time as returning to the normal mode.

In a similar manner to the first embodiment, the multifunction peripheral 60 of the above-described present embodiment achieves the OFF mode in which the operation of the switching power supply 31 is completely stopped to make power consumption approximately zero and it is very effective in terms of power saving, while maintaining a state in which a network event can be detected even in the OFF mode.

Further, in the present embodiment, the photo coupler 72 is used to detect a network event and to form a discharging path in the OFF mode. Because the photo coupler 72 is less expensive than the photo relay, the cost of the multifunction peripheral 60 can be reduced, compared with a case in which the photo relay is used.

Although the photo coupler 72 is inexpensive, the photo coupler 72 has a lower electric-current driving capacity than the photo relay. Thus, in the present embodiment, the transistor 76 is provided in parallel with the photo coupler 72, so that discharge can be done through both of the photo coupler 72 and the transistor 76. Hence, while the photo coupler 72 having a low electric-current driving capacity is used, the backup voltage can be decreased quickly by the entire circuit.

Third Embodiment

Figure 5:
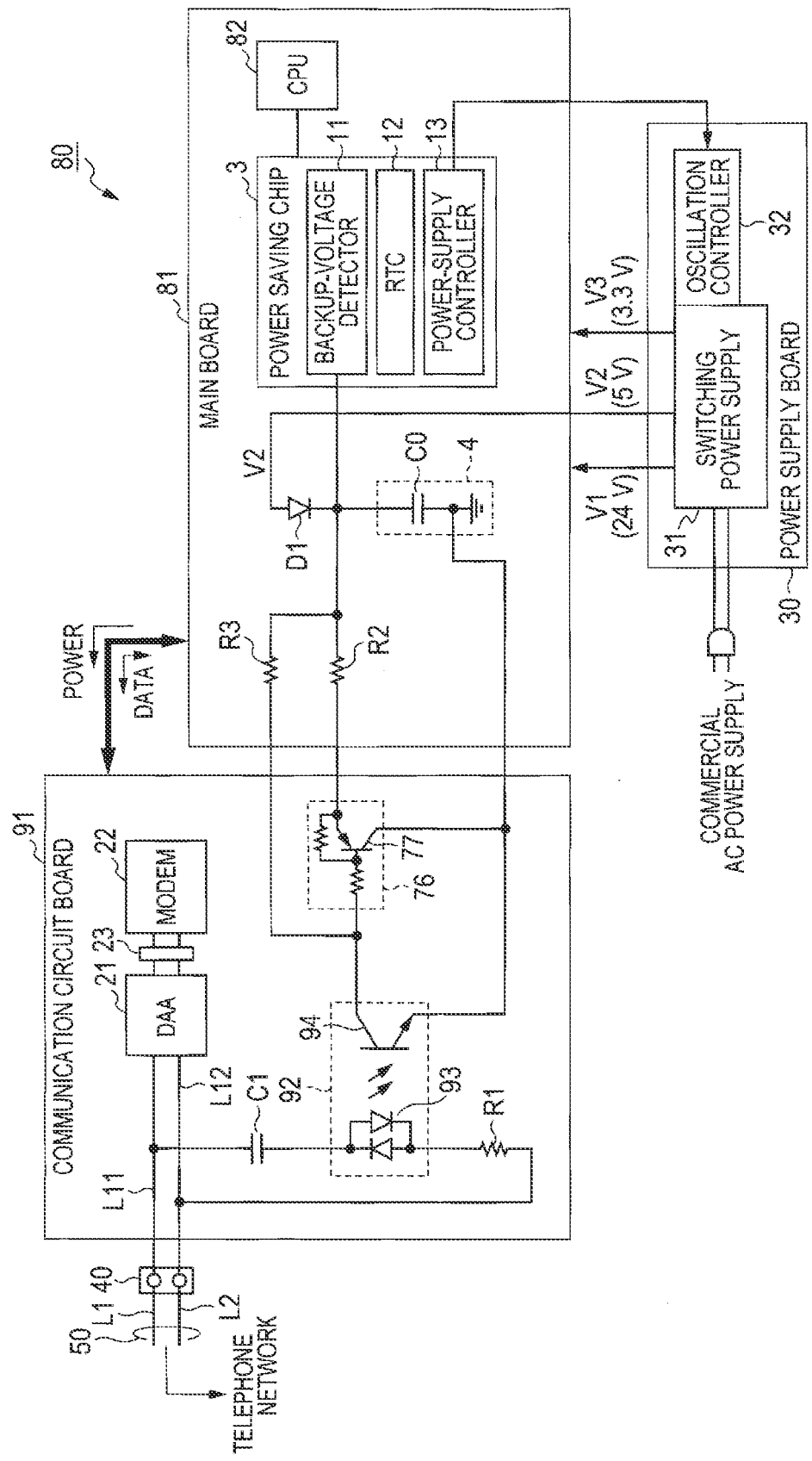
FIG. 5 is a diagram showing the overall configuration of a multifunction peripheral according to a third embodiment.

A multifunction peripheral 80 according to a third embodiment will be described while referring to FIG. 5. The multifunction peripheral 80 of the present embodiment shown in FIG. 5 has a different configuration from that of the multifunction peripheral 60 of the second embodiment shown in FIG. 4 mainly in the following three features (a) to (c).
(a) In a communication circuit board 91, the diode bridge 24 is omitted.
(b) In a photo coupler 92, a bi-directionally conductible light emitting diode section 93 is used at the input side (the primary side).
(c) In a main board 81, the relay 64 and the relay drive circuit 63 are omitted. Also, a function of controlling a relay is omitted from a CPU 82.

The photo coupler 92 includes the light emitting diode section 93 and the phototransistor 94. The light emitting diode section 93 has two light emitting diodes connected in parallel such that respective polarities are opposite. One end of the light emitting diode section 93 is connected to the network connection line L11 via the capacitor C1, and the other end of the light emitting diode section 93 is connected to the network connection line L12 via the resistance R1. Hence, when a network event occurs and an electrical change is generated in the telephone network, either one of the two light emitting diodes constituting the light emitting diode section 93 emits light, and the phototransistor 94 turns ON during that light emission.

An emitter of the phototransistor 94 is connected to the reference potential side of the supercapacitor C0 in the main board 81. The circuit configuration from a collector of the phototransistor 94 to the positive side of the supercapacitor C0 in the main board 81 is the same as that of the multifunction peripheral 60 in the second embodiment.

As described above, the multifunction peripheral 80 of the present embodiment achieves a network-event detecting function realized by the diode bridge 24 and the photo coupler 72 in the second embodiment, by using the photo coupler 92 that allows input of bi-directional electric current. Hence, the network-event detecting function can be realized in a simpler and less expensive manner. Further, a relay for connecting or cutting off the discharging path is omitted from the main board 81, which achieves downsizing and cost reduction.

[Modifications]

While the invention has been described in detail with reference to the above aspects thereof, it would be apparent to those skilled in the art that various changes and modifications may be made therein without departing from the scope of the claims.

(1) The specific configuration of the backup power supply 4 can be conceived in various manners. For example, a capacitor other than the supercapacitor C0 may be used. Or, electricity storage means other than capacitors (for example, a secondary battery of a small capacity) may be used.

(2) In the above-described embodiments, the return condition from the OFF mode based on the backup voltage is that the backup voltage becomes a voltage lower than or equal to the voltage threshold. This is just an example. Various return conditions may be set as long as a drop in the backup voltage (occurrence of a voltage reduction state) due to forcing discharge can be detected at occurrence of a network event. For example, it may be determined that a return condition is satisfied (a network event occurs) when a decrease rate of voltage of the supercapacitor C0 is larger than or equal to a particular value (that is, when the absolute value of a differential value is larger than or equal to a particular value).

(3) In the second embodiment and the third embodiment, it is not always necessary to provide the transistor 76 for forming a discharging path in parallel with the photo coupler. The transistor 76 may be replaced by a circuit element having a function equivalent to that of the transistor 76. Or, the transistor 76 may be omitted by using a photo coupler having a high electric-current driving capacity or a similar semiconductor relay, if such an element is available.

(4) In the above-described embodiments, the photo relay or the photo coupler is used as a means for detecting a network event in the OFF mode. This is also just an example. Another means other than the photo relay or the photo coupler may be used to detect a network event in the OFF mode and to form a forcing discharging path of the supercapacitor C0.

(5) in the above-described embodiment, the invention is applied to the multifunction peripheral 1. However, it goes without saying that the invention is not limited to the multifunction peripheral 1. The invention may be applied to various kinds of communication apparatuses that are connected to the telephone network for use.

What is claimed is:

1. A communication apparatus comprising:
a network connector connectable to a telephone network;
a communication circuit electrically connected to the network connector, the communication circuit configured to perform transmission and reception of signals with the telephone network through the network connector;
a main power supply configured to supply a supply target including the communication circuit with power for allowing the supply target to operate, the communication circuit being configured to operate by using power supplied from the main power supply;
a network-event detector electrically connected to the network connector, the network-event detector configured to detect an electrical change in the telephone network as a network event;
a backup power supply provided separately from the main power supply and configured to be charged with power supplied from the main power supply during operation of the main power supply, the backup power supply having a backup voltage;
a backup-voltage detector configured to operate by using power supplied from the backup power supply in a state where an operational mode of the communication apparatus is set to a stopped mode, and to detect occurrence of a voltage reduction state in the backup voltage;
a power-supply controller configured to operate by using power supplied from the backup power supply in the stopped mode, and to output a signal for starting operation of the main power supply and to set the operational mode to a normal mode in response to an occurrence of the voltage reduction state detected by the backup-voltage detector, the stopped mode being a mode in which the main power supply stops supply of power to the communication circuit and to the backup power supply, the normal mode being a mode in which the main power supply supplies the supply target with power;
a discharging path connected to the backup power supply; and
a main switch configured to:
cut off the discharging path in response to no occurrence of the network event in the stopped mode; and
allow conduction through the discharging path in response to occurrence of the network event in the stopped mode, thereby discharging charged power of the backup power supply causing the voltage reduction state in the backup voltage and the setting of the operational mode to the normal mode.

2. The communication apparatus according to claim 1, wherein the voltage reduction state is a state in which the backup voltage is lower than or equal to a voltage threshold.

3. The communication apparatus according to claim 2, further comprising a power-supply controller configured to operate by receiving power supply from the backup power supply and to output a stop-start signal for stopping or starting the main power supply,
wherein the voltage threshold is higher, by a particular value, than a minimum voltage required for a minimum basic function that is maintained in the stopped mode, the particular value being a voltage value that drops in a period from when the power-supply controller output the stop-start signal to the main power supply until when the main power supply starts charging of the backup power supply.

4. The communication apparatus according to claim 1, wherein the network-event detector comprises a light emitter and the main switch comprises a a light receiver, the light emitter and the light receiver constituting a photo relay;
wherein the light emitter is configured to, in response to occurrence of an electrical change in the telephone network, generate light from the electrical change; and
wherein the light receiver comprises a MOSFET provided in the discharging path and configured to, in response to receiving light generated by the light emitter, turn on and allow conduction through the discharging path.

5. The communication apparatus according to claim 4, further comprising a breaker provided in the discharging path, the breaker being configured to cut off the discharging path in the normal mode, regardless of whether the light emitter generates light.

6. The communication apparatus according to claim 5, wherein the breaker comprises:
a latching relay provided in the discharging path; and
a relay controller configured to turn off the latching relay to cut off the discharging path in response to the operational mode switching from the stopped mode to the normal mode, and to turn on the latching relay to allow conduction through the discharging path in response to the operational mode switching from the normal mode to the stopped mode.

7. The communication apparatus according to claim 5, wherein the breaker comprises:
a relay having a normally-closed contact and a relay coil, the relay being configured to keep an open state in response to energization to the relay coil; and
a relay controller configured to put the relay in the open state in response to the operational mode switching from the stopped mode to the normal mode.

8. The communication apparatus according to claim 7, further comprising a pull-up resistor provided between the main power supply and the relay controller,
wherein, in response to returning from the stopped mode to the normal mode and outputting of a particular voltage from the main power supply, the particular voltage is applied to the relay controller via the pull-up resistor.

9. The communication apparatus according to claim 4, further comprising a diode bridge configured to rectify an electrical change in the telephone network and to output the electrical change to the photo relay, the diode bridge having a pair of input terminals and a pair of output terminals,
wherein the pair of input terminals of the diode bridge is connected to respective ones of a pair of network connection lines for connecting to the telephone network, one of the pair of input terminals of the diode bridge being connected to one of the pair of network connection lines via a capacitor; and
wherein the pair of output terminals of the diode bridge is connected to the photo relay.

10. The communication apparatus according to claim 1, wherein the network-event detector comprises a light emitter and the main switch comprises a light receiving element, the light emitter and the light receiving element constituting a photo coupler;
wherein the light emitter is configured to, in response to occurrence of an electrical change in the telephone network, generate light from the electrical change; and wherein the light receiving element is provided in the discharging path and is configured to, in response to receiving light generated by the light emitter, turn on and allow conduction through the discharging path.

11. The communication apparatus according to claim 10, further comprising a subsidiary switch connected in parallel with the main switch, the subsidiary switch being configured to cooperate with the main switch to cut off the discharging path when the light receiving element is off, and configured to cooperate with the main switch to allow conduction through the discharging path when the light receiving element is on.

12. The communication apparatus according to claim 10, wherein the light emitter comprises two diodes connected in parallel such that respective polarities are opposite to each other; and
wherein both connected ends of the two diodes are connected directly or indirectly to respective ones of a pair of lines constituting the telephone network.

13. The communication apparatus according to claim 1, wherein the backup power supply comprises a capacitor.

14. The communication apparatus according to claim 1, wherein the voltage reduction state is a state in which a decrease rate of the backup voltage is larger than or equal to a particular value.

15. The communication apparatus according to claim 1, further comprising a processor configured to perform each function of the communication apparatus,
wherein the processor is configured to perform a startup handling process when the power-supply controller sets the operational mode to the normal mode in response to a particular return condition being satisfied, the startup handling process being a process of charging the backup power supply; and
wherein the processor is configured to set the operational mode to the stopped mode, in response to completion of the startup handling process and continuation of an unused state for a certain period.

16. The communication apparatus according to claim 1, further comprising
a clock configured to detect time,
wherein the power-supply controller is configured to output the signal for starting operation of the main power supply, based on one of a detection result of the backup-voltage detector and a detection result of the clock.

17. The communication apparatus according to claim 1, wherein neither the communication circuit nor the network-event detector is supplied with power from the backup power supply in the stopped mode.

18. The communication apparatus according to claim 1, wherein the network-event detector comprises a light emitting element configured to, in response to occurrence of an electrical change in the telephone network, generate light from the electrical change; and
wherein the main switch comprises a light receiving element configured to, in response to receiving light generated by the light emitting element, turn on and allow conduction through the discharging path.

* * * * *

UNITED STATES PATENT AND TRADEMARK OFFICE
CERTIFICATE OF CORRECTION

PATENT NO.        : 9,558,435 B2
APPLICATION NO.   : 14/317620
DATED             : January 31, 2017
INVENTOR(S)       : Jagatjyoti Ghimire et al.

It is certified that error appears in the above-identified patent and that said Letters Patent is hereby corrected as shown below:

In the Claims

Column 18, Claim 4, Line 6 should read: and the main switch comprises a light receiver, the light Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*